United States Patent
Cadieux et al.

(10) Patent No.: US 6,985,755 B2
(45) Date of Patent: Jan. 10, 2006

(54) REDUCED POWER CONSUMPTION WIRELESS INTERFACE DEVICE

(75) Inventors: Kevin Cadieux, Solana Beach, CA (US); Robert W. Hulvey, Hermosa Beach, CA (US)

(73) Assignee: Broadcom Corporation, Irvine, CA (US)

( * ) Notice: Subject to any disclaimer, the term of this patent is extended or adjusted under 35 U.S.C. 154(b) by 398 days.

(21) Appl. No.: 10/291,030

(22) Filed: Nov. 8, 2002

(65) Prior Publication Data

US 2004/0097265 A1 May 20, 2004

Related U.S. Application Data

(60) Provisional application No. 60/373,314, filed on Apr. 17, 2002.

(51) Int. Cl.
*H04M 1/00* (2006.01)
*G06F 15/16* (2006.01)
*G09G 5/00* (2006.01)

(52) U.S. Cl. .................. 455/557; 455/557.1; 709/219; 345/156

(58) Field of Classification Search ............... 455/574, 455/572, 557, 566, 69, 70, 226.1, 557.1; 370/248, 338, 350; 709/227, 219; 345/169, 345/156, 173, 158
See application file for complete search history.

(56) References Cited

U.S. PATENT DOCUMENTS

| | | | | |
|---|---|---|---|---|
| 5,307,297 A | * | 4/1994 | Iguchi et al. ............... | 345/169 |
| 5,990,868 A | * | 11/1999 | Frederick .................... | 345/158 |
| 6,137,473 A | * | 10/2000 | Cortopassi et al. ......... | 345/156 |
| 6,209,034 B1 | * | 3/2001 | Gladwin et al. ............ | 709/227 |
| 6,278,887 B1 | * | 8/2001 | Son et al. ................... | 455/566 |
| 6,359,610 B1 | * | 3/2002 | Shah et al. ................. | 345/156 |
| 6,380,930 B1 | * | 4/2002 | Van Ruymbeke .......... | 345/173 |
| 6,753,852 B1 | * | 6/2004 | Wen-Hsiang ............... | 345/169 |
| 6,768,721 B1 | * | 7/2004 | Schmitz et al. ............. | 370/248 |
| 6,782,245 B1 | * | 8/2004 | Lazzarotto et al. ....... | 455/226.1 |
| 2002/0046261 A1 | * | 4/2002 | Iwata et al. ................. | 709/219 |
| 2002/0159434 A1 | * | 10/2002 | Gosior et al. ............... | 370/350 |
| 2003/0012163 A1 | * | 1/2003 | Cafarelli et al. ............ | 370/338 |
| 2003/0050103 A1 | * | 3/2003 | Tourrilhes et al. .......... | 455/574 |

FOREIGN PATENT DOCUMENTS

| | | | | |
|---|---|---|---|---|
| CA | 2245287 A | * | 9/1998 | |
| KR | 2003030651 A | * | 10/2001 | |

* cited by examiner

*Primary Examiner*—William Trost
*Assistant Examiner*—Kiet Doan
(74) *Attorney, Agent, or Firm*—Garlick, Harrison & Markison LLP; Bruce Garlick

(57) ABSTRACT

A wireless interface device services communications between a wirelessly enabled host and at least one user input device. The wireless interface device includes a wireless interface unit, a processing unit, an input/output unit, and a power management unit. The wireless interface unit wirelessly interfaces with the wirelessly enabled host using a communication interface protocol. The power management unit operably couples to the wireless interface unit, the processing unit, and the input/output unit. The power management unit and the processing unit operate to control the power consumption of the wireless interface unit and the processing unit by powering down the wireless interface device and controlling the power consumption of the processing unit. The input/output unit remains powered to detect user input. When user input is detected, the wireless interface unit and processing unit are fully powered.

51 Claims, 11 Drawing Sheets

REDUCED POWER CONSUMPTION WIRELESS INTERFACE DEVICE

CROSS REFERENCE TO RELATED APPLICATION

This application claims priority to U.S. Provisional Application Ser. No. 60/373,314, filed Apr. 17, 2002, the disclosure of which is incorporated herein by reference.

BACKGROUND

1. Technical Field

The present invention relates generally to digital computers; and more particularly to wireless interface devices coupled to digital computers.

2. Related Art

Digital computers have been known in the art for years. Personal digital computers typically include a case, a video display, and one or more input/output devices. The case typically includes a power supply, a cooling fan, a motherboard, interface ports, peripheral cards, a disk drive, and other components. Contained on the motherboard are a processor, memory, a processor chip set, and one or more peripheral buses. The peripheral cards interface input/output devices with the motherboard via the peripheral buses. Other input/output devices may couple directly to the motherboard via appropriate connectors, e.g., devices coupled via a parallel port, devices coupled via a serial port, and devices coupled via a USB.

Input devices receive input from a user or another source while output devices provide output to a user or another destination. Keyboards, computer mice, microphones, scanners, etc. are typically considered input devices because they receive input but provide no output. Monitors, speakers, printers, etc. are considered output devices because they provide output to the user but receive no input from the user. Other devices, such as touch sensitive monitors, that both receive input and produce output are considered to be both input and output devices.

Wireless communication technology has rapidly advanced over the past few years. Resultantly, computer input/output devices are now being called upon to wirelessly communicate with their "host" computers. Wireless keyboards and mice now couple via wireless connections to their host computers. These "wireless" input devices provide great benefits in that they require no wired connections with their host computers. However, the lack of a wired connection also requires that the wireless input devices contain their own power supply, i.e., that they be battery powered. In order to extend the life of their batteries the wireless input devices often support power saving modes of operation. Unfortunately, none of these power savings modes reduces power consumption to levels that would extend battery life more than a few weeks. Resultantly, the benefits achieved via wireless connectivity is met or exceeded by the repeated chore and expense of frequently changing batteries in the device.

Thus, there is a need in the art for a wireless input device that operates for an extended period on a single battery life.

SUMMARY OF THE INVENTION

Thus in order to overcome the shortcomings of the prior devices among other shortcomings within the wireless user interface realm, a wireless interface device constructed according to the present invention services communications between a wirelessly enabled host and at least one user input device. The wireless interface device includes a wireless interface unit, a processing unit, an input/output unit, and a power management unit. The wireless interface unit wirelessly interfaces with the wirelessly enabled host using a communication interface protocol. In an embodiment described herein, this communication interface protocol is the Bluetooth communication interface protocol. However, other communication protocols could also be employed with the present invention.

The processing unit couples to the wireless interface unit via the system bus. The input/output unit also operably couples to the processing unit via the system bus. The input/output unit also operably couples to the at least one user input device. In an embodiment described herein, the user input device is a computer mouse and/or a computer keyboard. Each of these input devices receives input from a user and may provide minimal feedback to the user via the lighting of indicator lights.

The power management unit operably couples to the processing unit, and the input/output unit. The power management unit operates to control the power consumption of the processing unit, which in turn does/may manage the power consumption of the wireless interface unit. In performing its power management unit operations, the power management unit may enter one of three power down modes.

In a first power down mode, the power management unit powers down the wireless interface unit and the processing unit. In this mode of operation, battery consumption of the wireless interface device is significantly reduced. However, in the power down operation, the input/output unit remains powered such that it can receive input from a coupled user input device. The input/output unit indicates to the power management unit when it receives any user input. When user input is received, the input/output unit notifies the power management unit that activity has commenced. In response, the power management unit powers up the wireless interface unit and the processing unit so that the input can be relayed to the wirelessly enabled host.

In a second power down mode, the processing unit instructs the wireless interface unit to power down by communicating with it over the system bus. The processing unit then informs the power management unit that it is ready to have its clock gated. The power management unit then gates the system clock supplied to the processing unit. The total power consumption of the processing unit is a function of the sum of both the static and dynamic current that it consumes. Dynamic current is generally linearly related to the clock frequency driving the logic. Static current, also called quiescent current, is typically due to leakage, and is a function of the size of the circuit. By gating the clock, the power consumption of the circuit is reduced to only the static component of the current. Particularly in CMOS technology, the static current is on the order of microamps. Hence, the current pulled by the processing unit is reduced to a very small level, while maintaining the state of all memory circuits within the part. The clock oscillator is left running in this mode, enabling the power management unit to resume full operation of the processing unit by simply ungating the clock.

With a third power down mode, the clock oscillator is turned off. This has the same effect as gating the clock, as in the second mode, but also eliminates the current consumed in the clock oscillator. When the input/output unit detects user input, the input/output unit notifies the power management unit that activity has commenced. In response, the power management unit powers up the clock oscillator and the processing unit as well as the wireless interface unit s so that the input can be relayed to the wirelessly enabled host.

According to one embodiment in the present invention, the wireless interface device is constructed on a single monolithic integrated circuit. The single monolithic integrated circuit may be contained within a wireless mouse or within a wireless keyboard when installed. The wireless mouse and the wireless keyboard are battery powered such that a single battery or pair of batteries provides all operating voltage for the device. In another embodiment, the mouse is wired to the keyboard and the wireless interface device is contained in the keyboard.

In one embodiment, the monolithic integrated circuit includes a conductive pad ring that is formed near the boundary of the integrated circuit. The wireless interface unit and the processing unit coupled to the conductive pad ring via respective voltage regulation circuitry. A battery providing a voltage source to the integrated circuit is coupled directly to the pad ring. Further, the input/output unit and power management unit are both powered directly from the pad ring. With this structure, the power management unit has control of the voltage regulation circuitry that powers each of the wireless interface unit and the processing unit. During reduced power operations (first power down mode), the power management unit powers down the wireless interface unit and the processing unit to significantly reduce power consumption. By running directly from the battery, the quiescent current normally required by a voltage regulator is eliminated during the power-down mode.

In one embodiment of the present invention, in which the wireless interface device is powered by a pair of AA or AAA batteries, in power down mode battery life is exceptionally long, e.g., 160 months. As compared to normal operating modes in which all components of the wireless interface device are powered, e.g., 3 days, battery life is significantly longer.

Moreover, other aspects of the present invention will become apparent with further reference to the drawings and specification, which follow.

DETAILED DESCRIPTION OF THE DRAWINGS

Figure 1A:
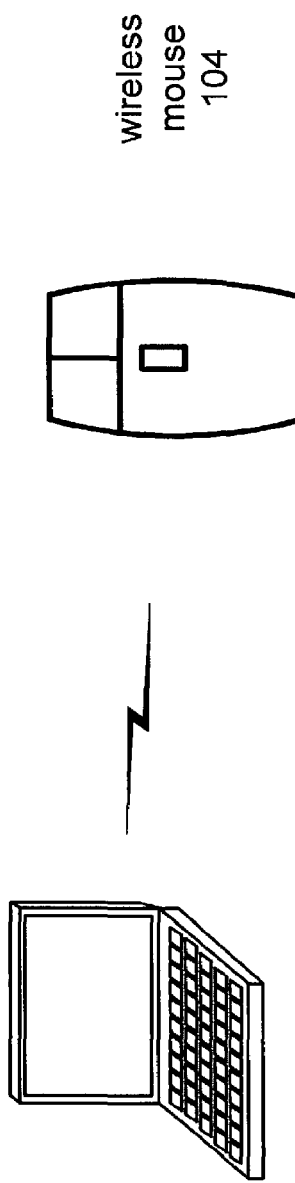
FIG. 1A is a system diagram illustrating a PC host and a wireless mouse that includes a wireless interface device constructed according to the present invention.

FIG. 1A is a system diagram illustrating a PC host 102 and a wireless mouse 104 that includes a wireless interface device constructed according to the present invention. As shown in FIG. 1A, the PC host 102 wirelessly couples to the wireless mouse 104. In the structure of FIG. 1A, the wireless mouse 104 includes a wireless interface device that operates to place the wireless mouse in any of a number of reduced power operating modes, including a power down mode in which battery life is substantially extended.

Figure 1B:
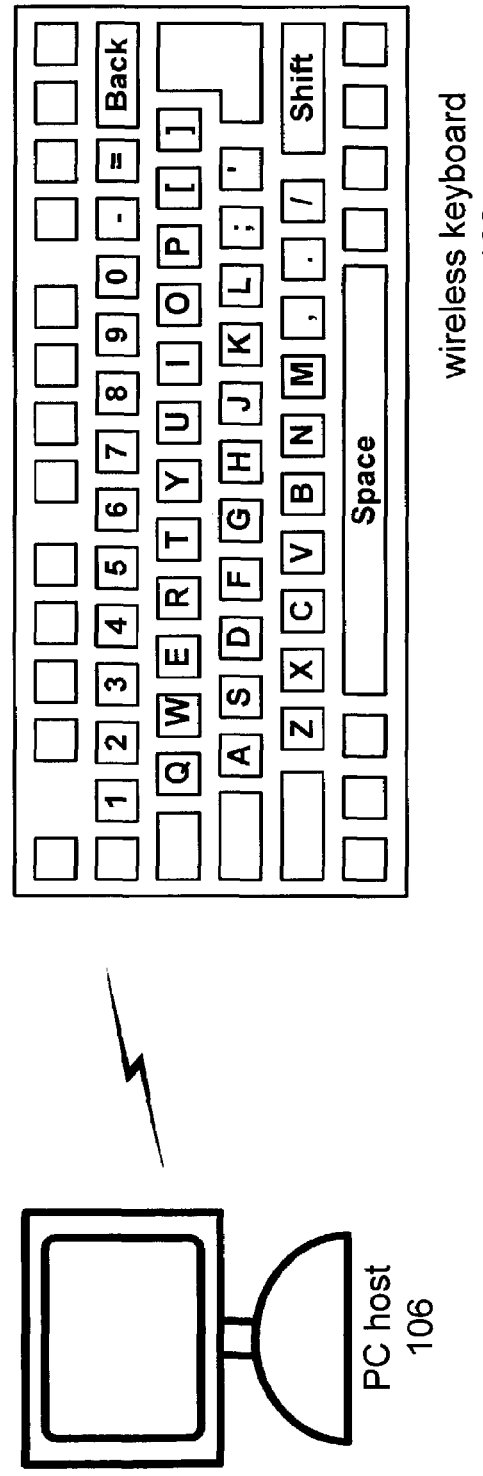
FIG. 1B is a system diagram illustrating a PC host and a wireless keyboard that includes a wireless interface device constructed according to the present invention.

FIG. 1B is a system diagram illustrating a PC host 106 and a wireless keyboard 108 that includes a wireless interface device constructed according to the present invention. The wireless keyboard 108 is battery powered and operates for extended periods on a single set of batteries because of the greatly reduced power consumption operations according to the present invention.

Figure 2:
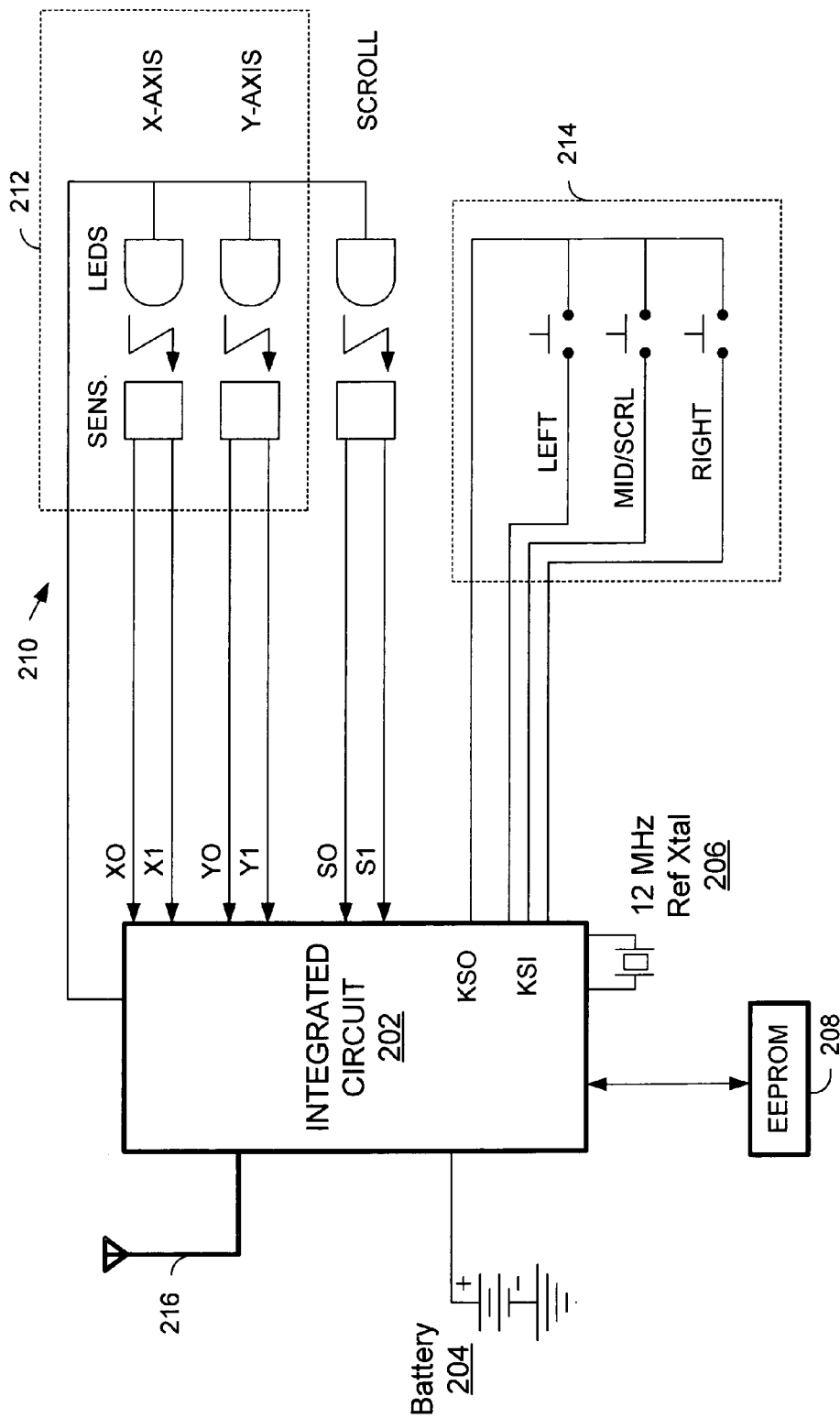
FIG. 2 is a schematic block diagram illustrating the structure of a wireless mouse that includes a wireless interface device constructed according to the present invention.

FIG. 2 is a schematic block diagram illustrating the structure of a wireless mouse that includes a wireless interface device constructed according to the present invention. An integrated circuit 202 constructed according to the present invention serves as the wireless interface device and couples to various mouse inputs 210. These mouse inputs 210 include x-axis and y-axis inputs as well as a scroll input. The x-axis and y-axis inputs are often referred to a "quadrature" inputs. The components that produce the quadrature inputs are generally referred to at numeral 212 and may be constructed from optical inputs instead of from conventional mechanical inputs. Referenced via numeral 214 are the button inputs that are typical with a computer mouse and include the left button input, the middle/scroll button input, and the right button input. As is shown, each of the signals produced by the mouse are received by integrated circuit 202.

Integrated circuit 202 also couples to battery 204, crystal 206 that produces a 12 MHz reference frequency, EEPROM 208, and antenna 216. In one embodiment of the present invention, battery 204 comprises a pair of either AA batteries or AAA batteries. Antenna 216 is an internal antenna in the described because of the size constraints of the mouse and because of the relatively short distance between the PC host and the wireless mouse.

Figure 3:
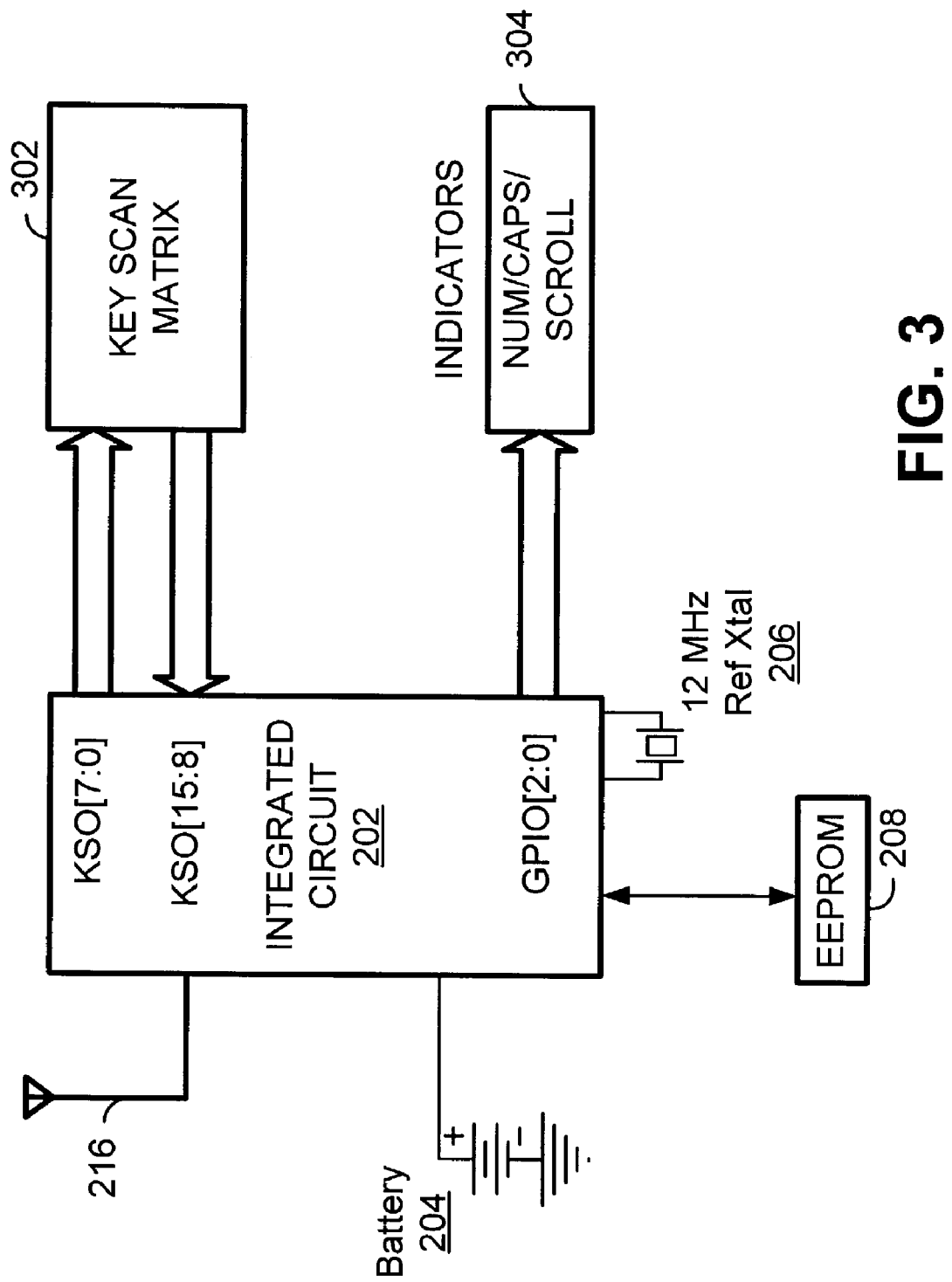
FIG. 3 is a schematic block diagram illustrating the structure of a wireless keyboard that includes a wireless interface device constructed according to the present invention.

FIG. 3 is a schematic block diagram illustrating the structure of a wireless keyboard that includes a wireless interface device (integrated circuit 202) constructed according to the present invention. As shown in FIG. 3, integrated circuit 202 services a key scan matrix 202 that provides inputs from the keyboard. Indicators 304 include num-lock, caps-lock, and scroll-lock indicator lights that are lit on the keyboard. The integrated circuit 202 couples to a battery 204, a crystal 206, an EEPROM 208, and an antenna 216.

In another embodiment (not shown in either FIG. 2 or FIG. 3), the integrated circuit 202 services both mouse and keyboard input and may reside internal to either the mouse of the keyboard. As is relatively apparent to the reader, because the input signals differ, multiplexing or signal sharing may be required. However, different signal lines may be dedicated for keyboard and for mouse inputs such that no signal sharing is required. As is apparent, when the integrated circuit 202 alone services both mouse and keyboard input wired connectivity between the keyboard and the mouse is required.

Figure 4:
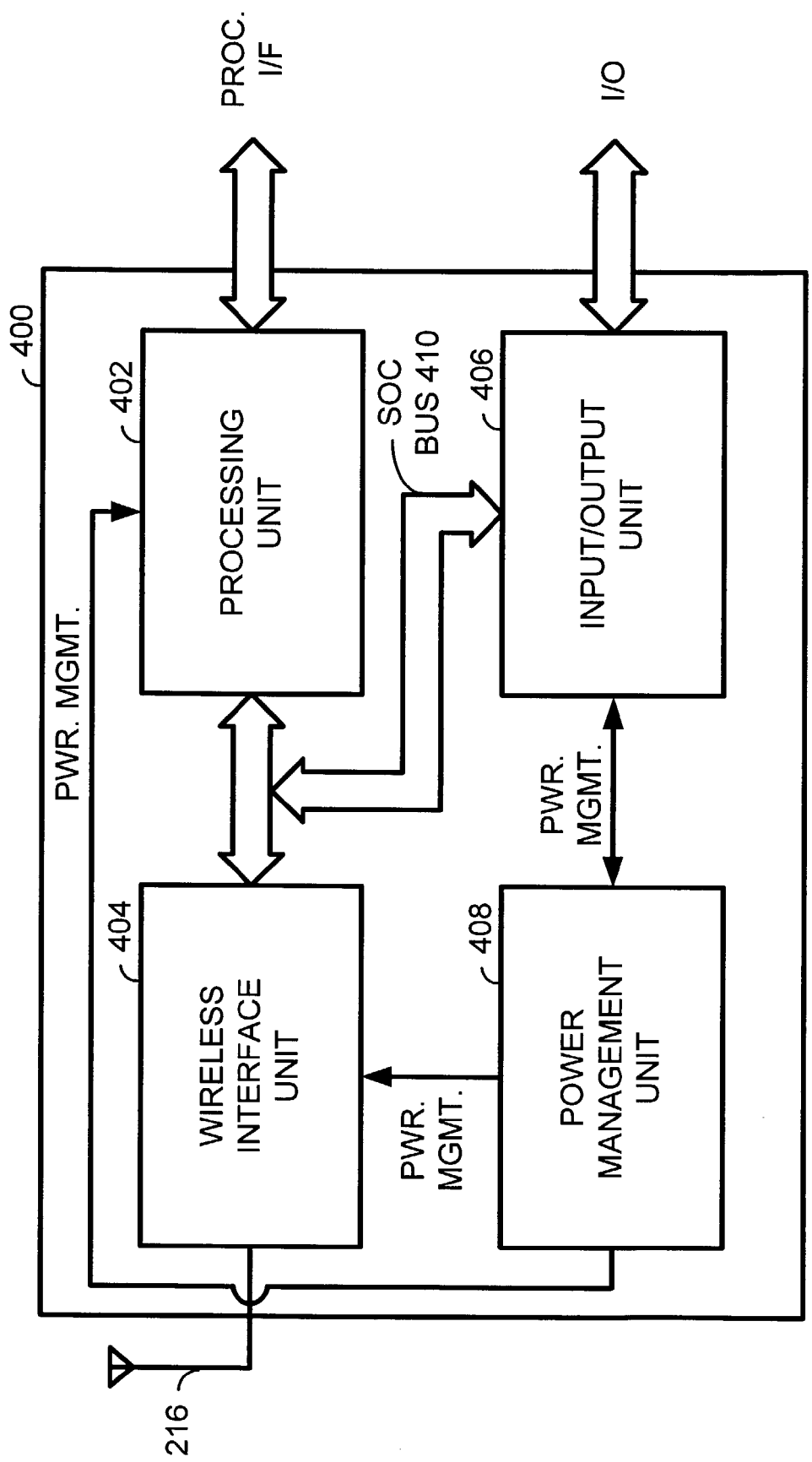
FIG. 4 is a block diagram illustrating a wireless interface device (integrated circuit) constructed according to the present invention.

FIG. 4 is a block diagram illustrating a wireless interface device (integrated circuit) constructed according to the present invention. As shown in FIG. 4, the wireless interface device 400 includes a processing unit 402, a wireless interface unit 404, an input/output unit 406, and a power management unit 408. The wireless interface unit 404 couples the wireless interface device 400 to antenna 216. The wireless interface unit 404 operates according to the Bluetooth specification and in particular to the Human Interface Device (HID) portion of the Bluetooth specification.

Figure 5:
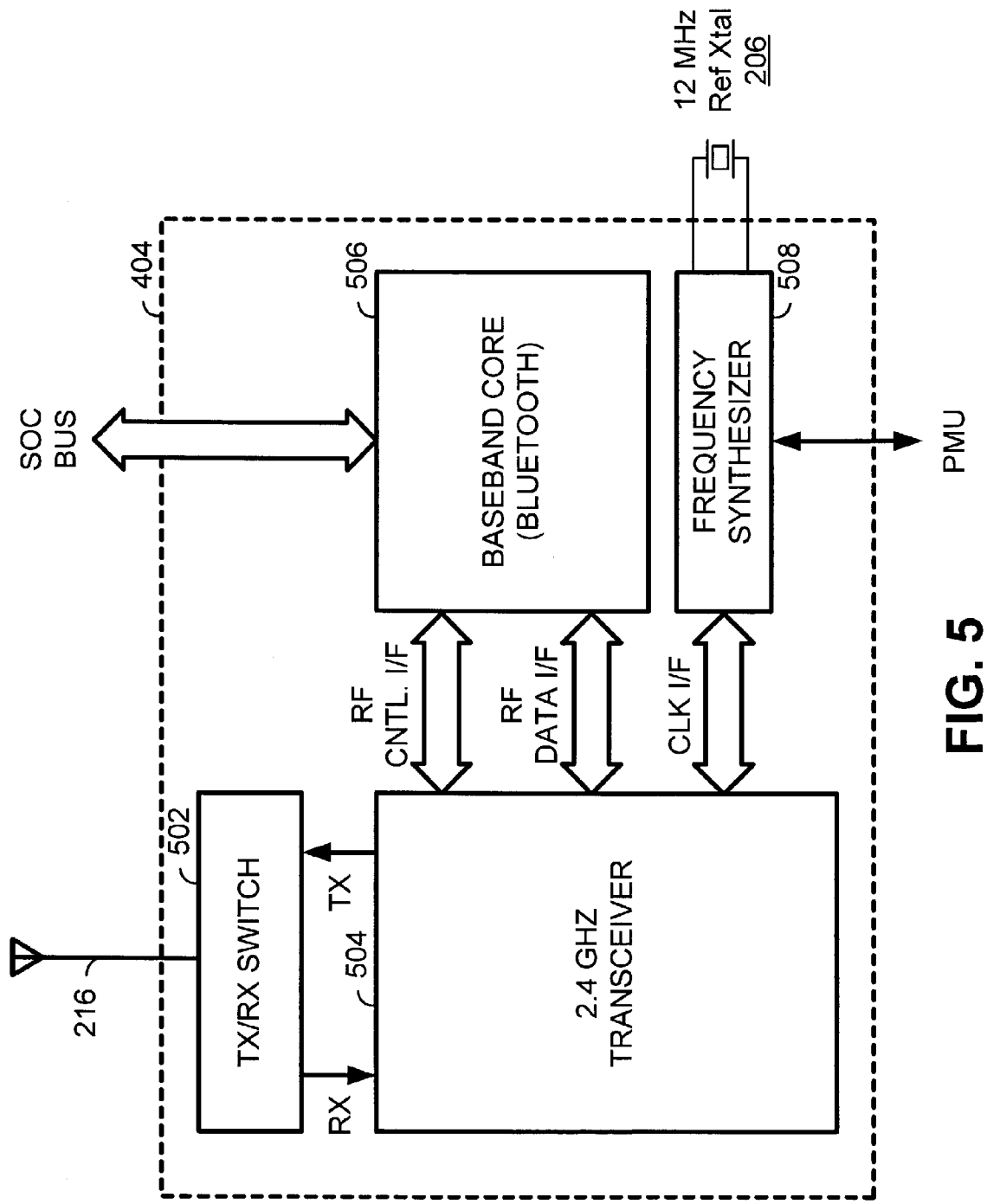
FIG. 5 is a block diagram illustrating a wireless interface unit of the wireless interface device of FIG. 4.

Processing unit 402, wireless interface unit 404, and input/output unit 406 couple with one another via a system on chip (SOC) bus 410. Processing unit 402 includes a processing interface that may be used to couple the processing unit to one or more devices devices. Input/output unit 406 includes an input/output set of signal lines that couple the wireless interface device 400 to at least one user input device, e.g., keyboard and/or mouse FIG. 5 is a block diagram illustrating a wireless interface unit of the wireless interface device of FIG. 4. The wireless interface unit 404 includes a transmit/receive switch 502, a 2.4 GHz transceiver 504, a Bluetooth core 506, and a frequency synthesizer 508. Each of these components is generally known in the field and will be described in minimal detail herein.

The transmit/receive switch 502 couples to antenna 216 and switches between transmit and receive operations. The 2.4 GHz transceiver 504 performs all RF front-end operations and operates within a frequency band and on particular channels as are specified by the Bluetooth operating standard. The 2.4 GHz transceiver 504 couples to baseband core 506, which in the present invention is a Bluetooth baseband core. Such coupling is performed via an RF control interface and an RF data interface. The RF control interface performs the necessary control operations to guaranty that the 2.4 GHz transceiver 504 and the baseband core 506 will operate consistently with desired operating specifications. The RF data interface transfers both Rx and Tx data between the 2.4 GHz transceiver 504 and the baseband core 506. Frequency synthesizer 508 couples to the power management unit 408, to the external crystal 206 operating at 12 MHz, and to the 2.4 GHz transceiver 504. The frequency synthesizer 508 is controlled to provide an RF frequency for the 2.4 GHz transceiver 504 which is used to mix with the baseband signal received from the baseband core during a transmit operation and to mix with the received RF signal during a receive operation. The baseband core 506 couples to other wireless interface devices via the SOC bus 410.

Figure 6:
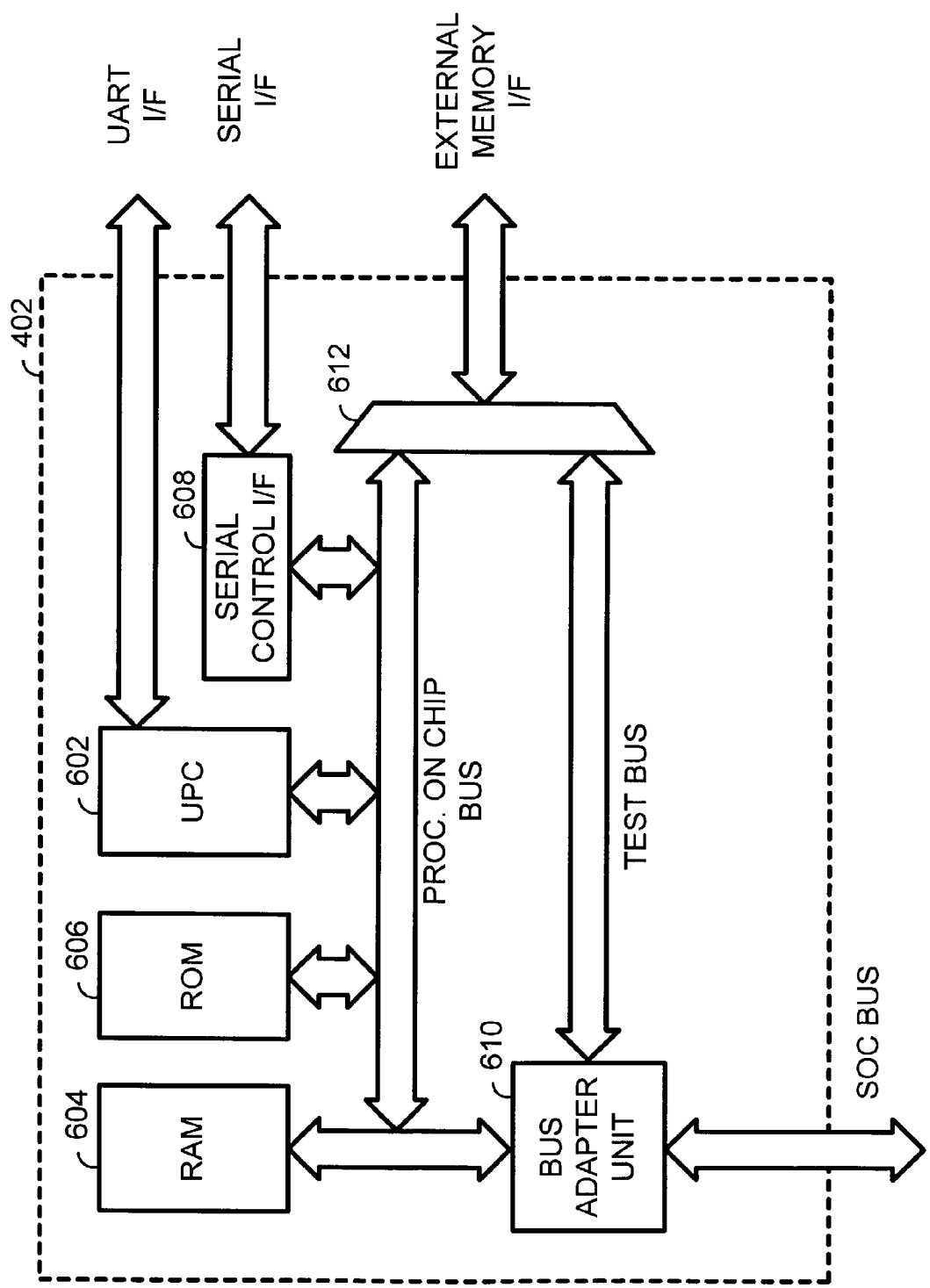
FIG. 6 is a block diagram illustrating a processing unit of the wireless interface device of FIG. 4.

FIG. 6 is a block diagram illustrating a processing unit 402 of the wireless interface device of FIG. 4. The processing unit 402 includes a microprocessor core 602, read only memory 606, random access memory 604, serial control interface 608, bus adapter unit 610; and multiplexer 612. The microprocessor core 602, ROM 606, RAM 604, serial control interface 608, bus adapter unit 610, and multiplexer 612 couple via a processor on a chip bus. Multiplexer 612 multiplexes an external memory interface between the processor on a chip bus and a test bus. The bus adapter unit 610 interfaces the processor on a chip bus with the SOC. The microprocessor core 602 includes a universal asynchronous receiver transmitter interface that allows direct access to the microprocessor core. Further, the serial control interface 608 provides a serial interface path to the processor on a chip bus.

Figure 7:
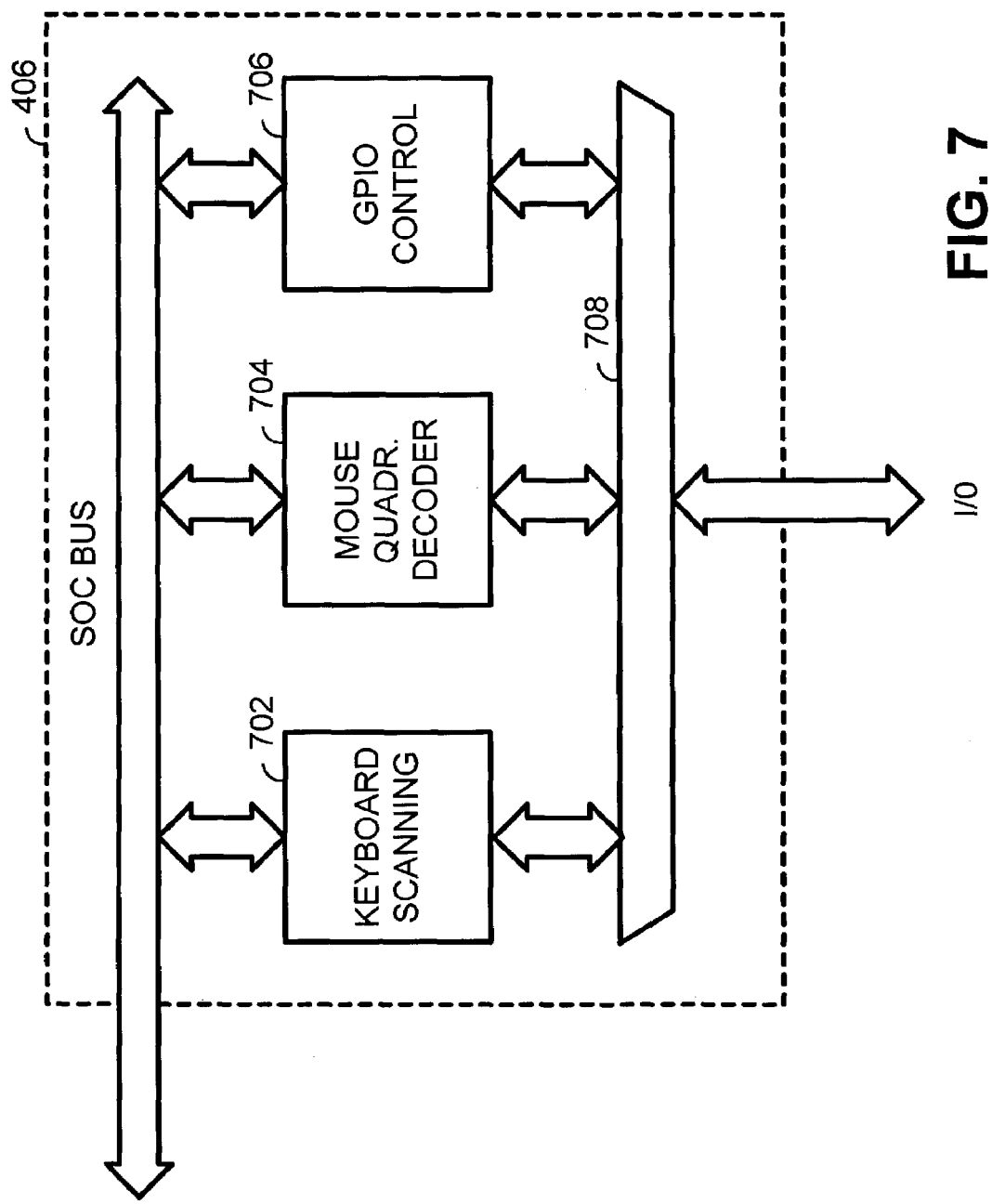
FIG. 7 is a block diagram illustrating an input/output unit of the wireless interface device of FIG. 4.

FIG. 7 is a block diagram illustrating an input/output unit 406 of the wireless interface device of FIG. 4. The input/output unit 406 includes a keyboard-scanning block 702, a mouse quadrature decoder block 704, and a GPIO control block 706. Each of the keyboard scanning block 702, the mouse quadrature decoder block 704, and the GPIO control block 706 couple to the SOC bus. Further, each of the keyboard scanning block 702, the mouse quadrature decoder block 704, and the GPIO control block 706 couple to I/O via multiplexer 708. This I/O couples to the at least one user input device.

In another embodiment of the input/output unit 406, each of the keyboard scanning block 702, the mouse quadrature decoder block 704, and the GPIO control block 706 couples directly to external pins that couple to the at least one user input device.

Figure 8:
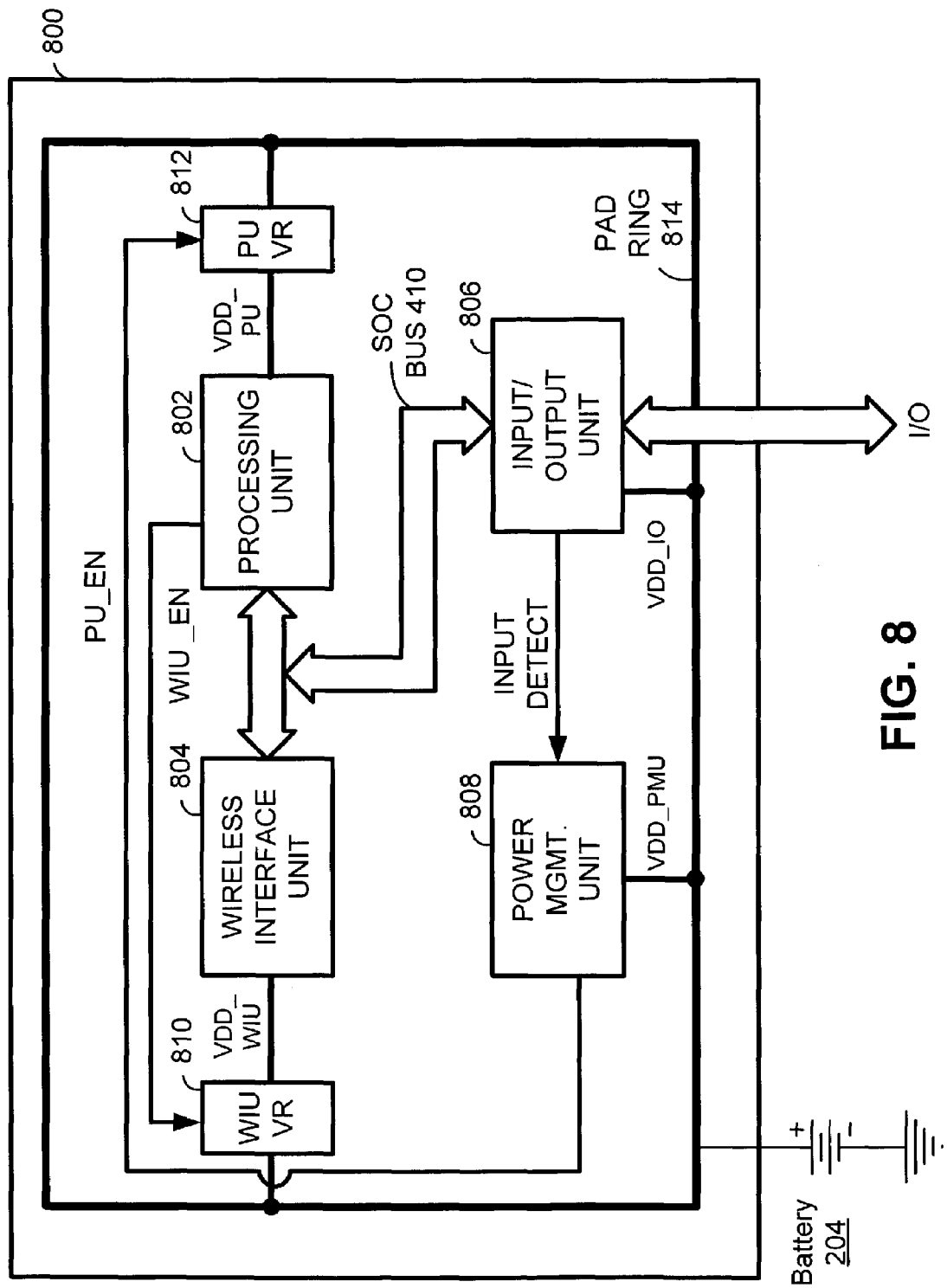
FIG. 8 is a block diagram generally showing the structure of an integrated circuit constructed according to the present invention with particular detail in the coupling of battery power to the units of the device.

FIG. 8 is a block diagram generally showing the structure of an integrated circuit constructed according to the present invention with particular detail in the coupling of battery power to the units of the device. Integrated circuit 800 of FIG. 8 includes a wireless interface unit 804, processing unit 802, input/output unit 806, and power management unit 808. The processing unit 802, wireless interface unit 804, and input/output unit 806 couple via a SOC bus 410. Further, as was previously described, input/output unit 806 couples to at least one user input device via I/O connection.

With the integrated circuit 800 of FIG. 8, a pad ring 814 surrounds a substantial portion of the components of the integrated circuit. The pad ring 814 couples directly to battery 204, which powers the pad ring. Further, input/output unit 806 and power management unit 808 couple directly to pad ring 814 to receive their power and voltage. However, processing unit 802 couples to pad ring 814 via processing unit voltage regulation circuitry 812. Further, the wireless interface unit 804 couples to pad ring 814 via wireless interface unit voltage regulation circuitry 810. The processing unit voltage regulation circuitry 812 is controlled by the power management unit 808 via control signal PU__EN. Further, the wireless interface unit voltage regulation circuitry 810 is controlled by the processing unit 802 using control signal WIU__EN.

The integrated circuit operates in four different power-conserving modes: (1) busy mode; (2) idle mode; (3) suspend mode; and (4) power down mode. Busy mode, idle mode, and suspend mode are described in the Bluetooth specification. However, power down mode is unique to the present invention. Three different power down modes are described herein.

In busy mode mode, the Master (host computer) is actively polling the HID (wireless mouse, wireless keyboard, etc.) for data at a polling rate near 100 polls/second, or about once every 16 Bluetooth slot times (one Bluetooth slot is 625 $\mu$S). Continued user activity (keypad strokes, mouse motion, button presses, etc.) keeps the HID in busy mode. If there has been no activity for a few seconds (determined by particular settings), operation transitions to idle mode.

In idle mode, the HID requests the master (serviced host) to enter SNIFF mode with a SNIFF interval that is chosen based on desired latency and average power consumption. In one operation, the SNIFF interval is 50 ms, or about every 80 slot times. Although the HID can wake up immediately after an event, it may have to wait up to 100 mS to transmit its data to the host, and therefore must have enough buffer space to store 100 mS of events. If an event occurs, the HID requests the master to leave SNIFF mode. If there is no further activity for a longer period, the HID transitions from idle mode to suspend mode.

When entering suspend mode, there is a brief return on the connection state to busy mode to renegotiate the SNIFF interval to the suspend interval time. Then, the HID is parked. In suspend mode, a longer beacon interval can be used for a lower power state. When in suspend mode, any user input detected will result in the HID requesting to be unparked and transitioned back to the busy mode. When the HID is parked, it consumes less power than when the host is in SNIFF mode since the HID does not have to transmit. In suspend mode, the HID just listens to the beacons to remain synchronized to the master's frequency hopping clock. As long as the master continues transmitting (meaning the host is not turned off) the HID will remain in suspend mode mode. If link loss occurs due to the host being turned off without warning, or the host moving out of range, the Lost Link state will be entered. In another embodiment of the present invention, while in the suspend mode, the HID continues to remain in the SNIFF Bluetooth mode rather than being parked, e.g., with a longer SNIFF interval.

According to the present invention, the power down mode is also supported. In the power down mode, the power management unit 808 operates the processing unit voltage regulation circuitry 812 and the wireless interface unit voltage regulation circuitry 810 to power down the processing unit 802 and wireless interface unit 804, respectively. These states of operation will be described further with reference to FIGS. 9, 10, and 11.

Figure 9:
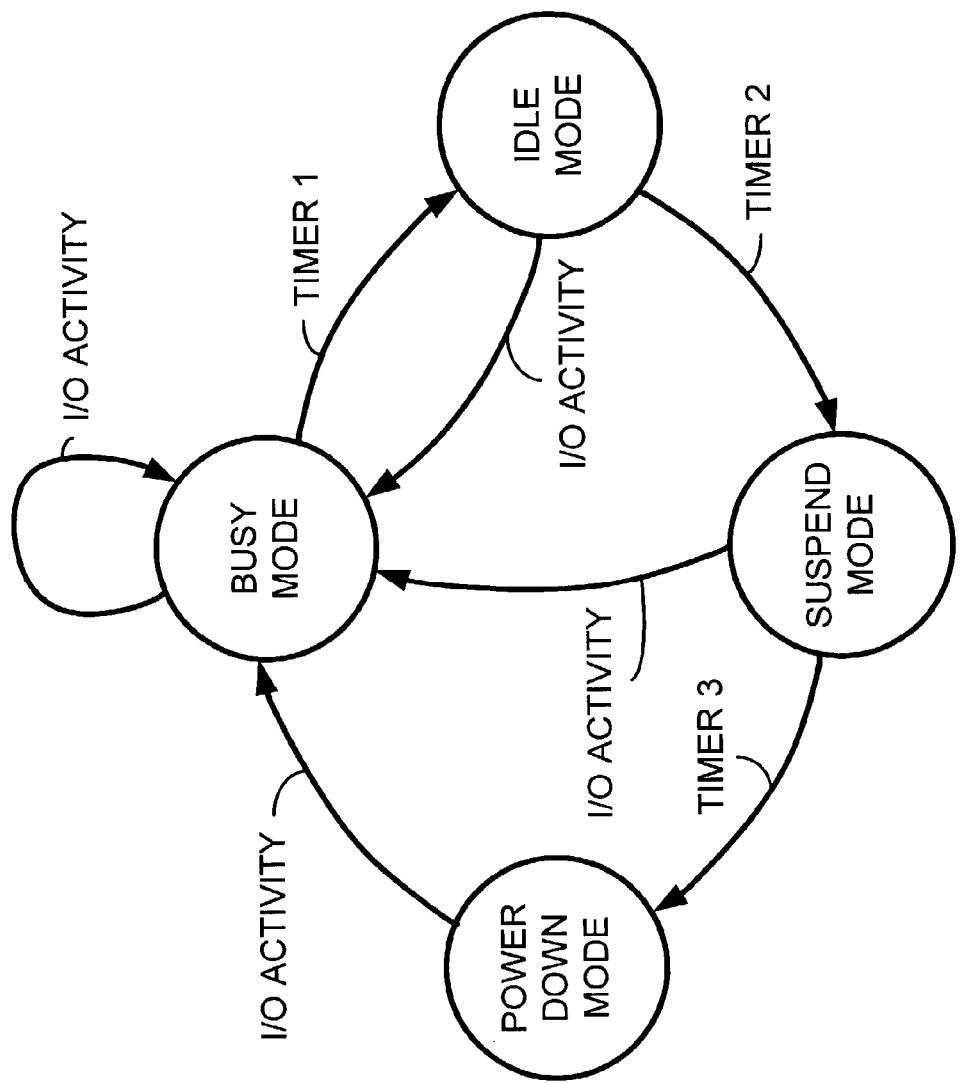
FIG. 9 is a logic diagram illustrating operation according to the present invention.

FIG. 9 is a logic diagram illustrating operation according to the present invention. As illustrated in FIG. 9, a wireless interface device operating according to the present invention operates in four separate power-conserving modes. These power conservation modes include the busy mode, the idle mode, the suspend mode and, the power down mode. The state diagram of FIG. 9 shows how each of these modes is reached during normal operation.

When the wireless interface device is initially powered up, it enters the busy mode of operation. In the busy mode of operation, all features and wireless operations of the wireless interface device are enabled. As long as I/O activity continues, the wireless interface device remains in the busy mode. However, after expiration of a first timer with no I/O activity, the operation moves from the busy mode to the idle mode. Operation will remain in idle mode until the expiration of a second timer or until I/O activity occurs.

If while in the idle mode I/O activity occurs, operation returns to the busy mode. If in the idle mode, if timer 2 expires with no additional I/O activity, suspend mode is entered. While in suspend mode, if I/O activity occurs, operation returns to busy mode. However, if in suspend mode, no additional I/O activity occurs until the expiration of a third timer, power down mode is entered. While in the power down mode, operation will remain in the power down mode until I/O activity occurs. When I/O activity occurs, operation of the wireless interface device will move from the power down mode to the busy mode.

Figure 10:
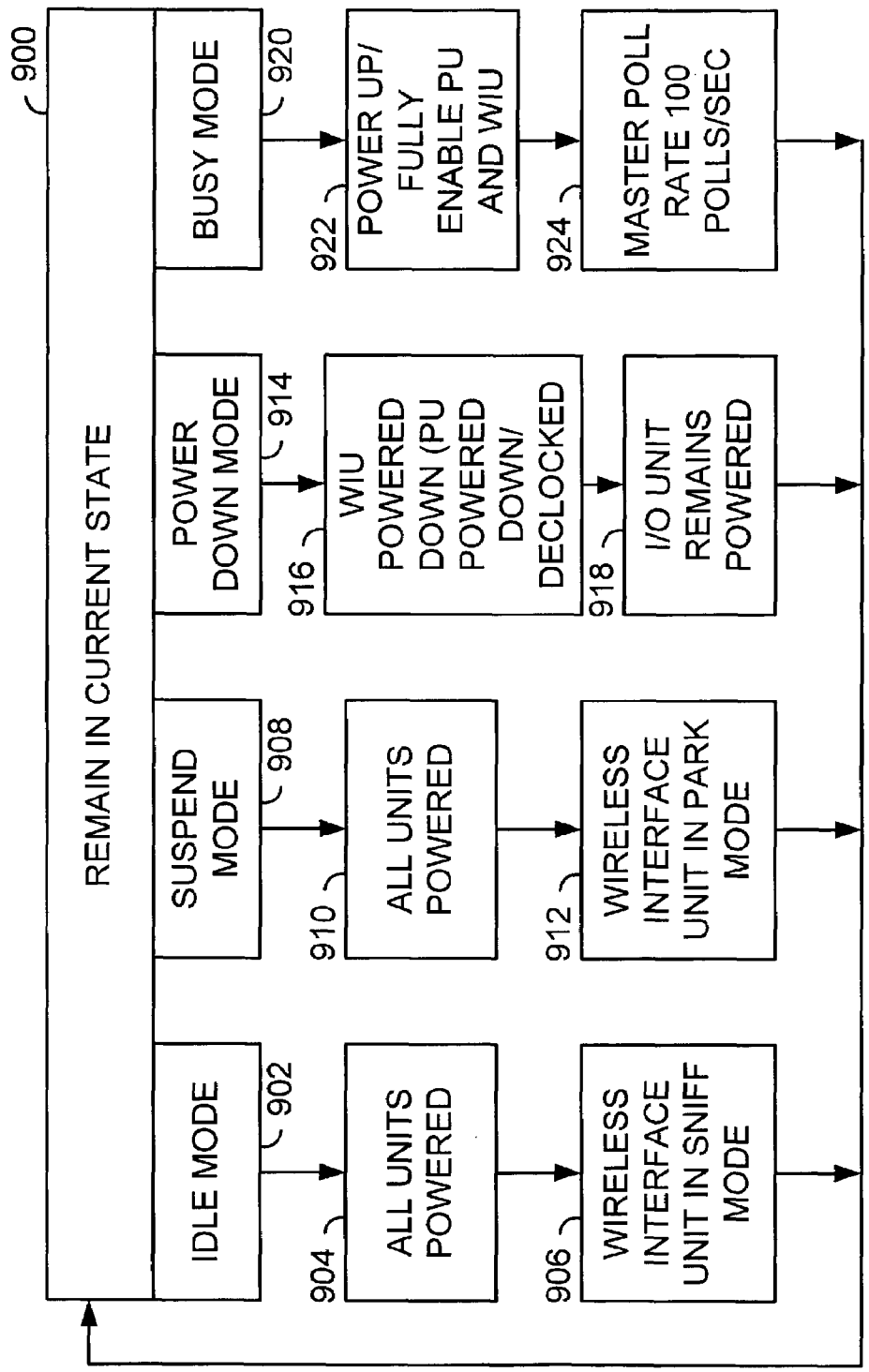
FIG. 10 is a logic diagram illustrating operation according to the present invention in controlling the power consumption of a serviced device.

FIG. 10 is a logic diagram illustrating operation according to the present invention in controlling the power consumption of a serviced device. As shown in FIG. 10, once operation in a particular power conservation state, e.g., busy mode, idle mode, suspend mode, and power down mode has commenced, operation will remain in that state until expiration of respective timer or I/O activity occurs (step 900).

When power conservation operation occurs to move from the busy mode to the idle mode (step 902), all portions of the wireless interface device remain powered (step 904). However, in the idle mode, the wireless interface unit enters a sniff mode in which some of its operations are reduced. Such operations were previously described with reference to FIG. 9. Further, additional information regarding this mode is available in the Bluetooth HID standard.

When the operation of the wireless interface device transitions from the idle mode to the suspend mode (step 908) all portions of the wireless interface device remain powered (step 910). However, the wireless interface unit of the wireless interface device enters the park mode, which consumes even less power than does the wireless interface unit when in the sniff mode.

When in the suspend mode if an additional timer or inactivity period expires, the wireless interface device will transition to the power down mode (step 914). In the power down mode, the wireless interface unit 804 is powered down and the processing unit 802 is placed into a power conservation state (step 916). In a first power down mode, the power management unit 808 powers down the wireless interface unit 804 and the processing unit 802. In this mode of operation, battery consumption of the wireless interface device is significantly reduced. However, in the power down operation, the input/output unit 806 remains powered such that it can receive input from a coupled user input device. The input/output unit 806 indicates to the power management unit 808 when it receives any user input. When user input is received, the input/output unit 806 notifies the power management unit 808 that activity has commenced. In response, the power management unit 808 powers up the wireless interface unit 804 and the processing unit 802 so that the input can be relayed to the wirelessly enabled host. Second and third power down modes will be described with reference to FIG. 11.

From any of the reduced power operating states, when I/O activity is sensed by the I/O block, the wireless input device will transition back to the busy mode (step 920). When such operation occurs, all components will be fully enabled (step 922). Then, in the busy mode, the wireless interface unit will operate in its normal state in which the master wireless device, i.e., wirelessly enabled host will poll the wireless interface device at 100 times per second. From each of steps 906, 912, 918, and 924, operation returns to step 902 wherein the current power conservation state will be kept until another event occurs.

Figure 11:
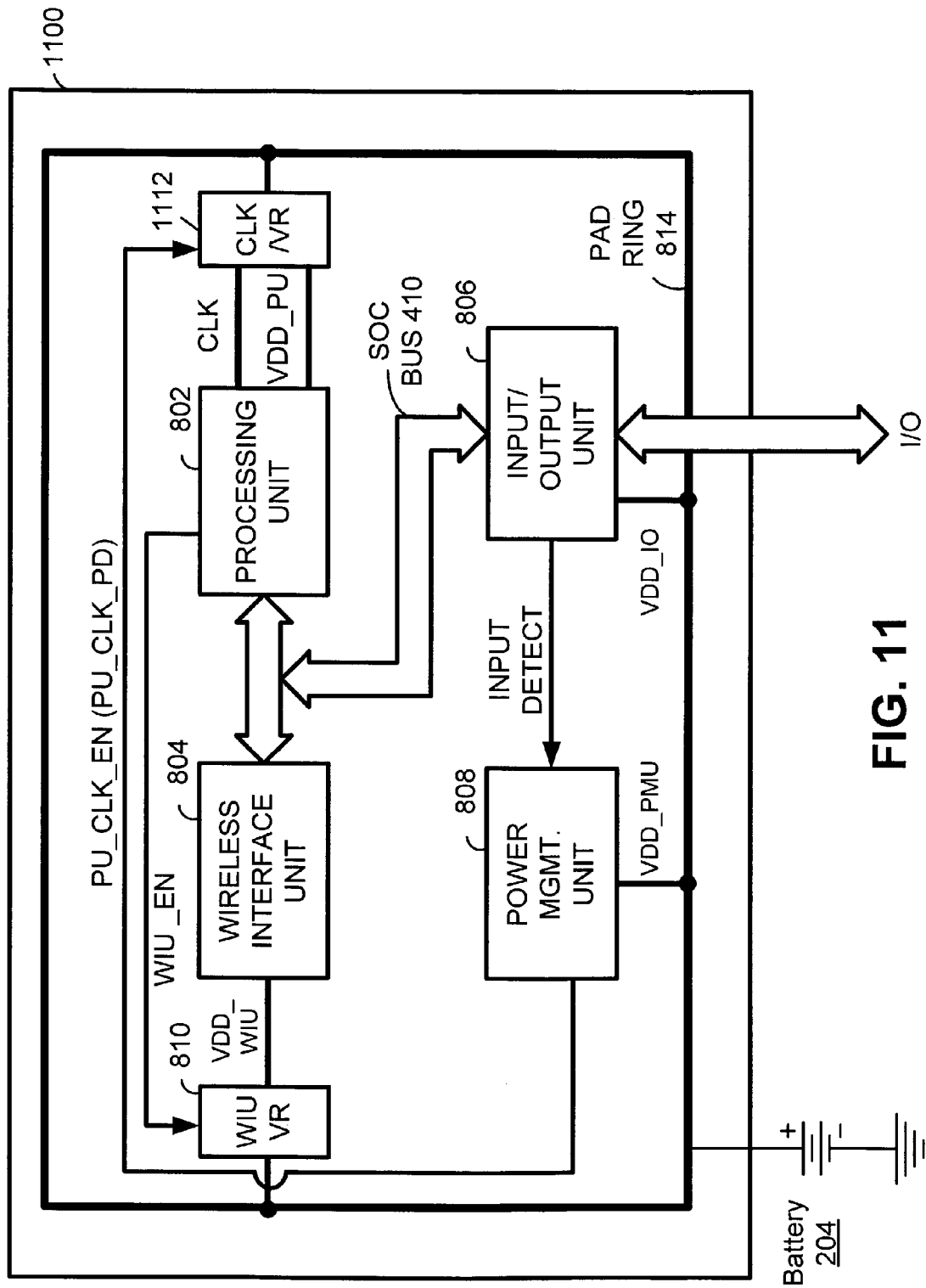
FIG. 11 is a block diagram generally showing an alternate structure of an integrated circuit constructed according to the present invention with particular detail in the coupling of battery power to the units of the device.

FIG. 11 is a block diagram generally showing an alternate structure of an integrated circuit constructed according to the present invention with particular detail in the coupling of battery power to the units of the device. The integrated circuit 1100 of FIG. 11 is similar in structure to the integrated circuit of FIG. 8. However, with the integrated circuit of FIG. 11, a clock/voltage regulator 1112 couples the processing unit 802 to the pad ring and controls not only the voltage supply VDD_PU to the processing unit 802 but also the clock input to the processing unit 802. The integrated circuit 1100 of FIG. 11 supports the second and third power down modes (as well as the first power down mode) of the present invention.

In a second power down mode, the processing unit 802 instructs the wireless interface unit 804 to power down by communicating with it over the system bus 410. The processing unit 802 then informs the power management unit 808 that it is ready to have its clock gated. The power management unit 808 then gates the system clock supplied to the processing unit 802. The total power consumption of the processing unit 802 is a function of the sum of both the static and dynamic current that it consumes. Dynamic current is generally linearly related to the clock frequency driving the logic. Static current, also called quiescent current, is typically due to leakage, and is a function of the size of the circuit. By gating the clock, the power consumption of the processing unit 802 is reduced to only the static component of the current. Particularly in CMOS technology, the static current is on the order of microamps. Hence, the current pulled by the processing unit 802 is reduced to a very small level, while maintaining the state of all memory circuits within the part. The clock oscillator 1112 is left running in this mode, enabling the power management unit to resume full operation of the processing unit by simply ungating the clock.

With a third power down mode, the clock oscillator is turned off. This has the same effect as gating the clock, as in the second mode, but also eliminates the current consumed in the clock oscillator. When the input/output unit 806 detects user input, the input/output unit 806 notifies the power management unit 808 that activity has commenced. In response, the power management unit 808 powers up the clock oscillator 1112 and the processing unit as well as the wireless interface unit s so that the input can be relayed to the wirelessly enabled host. Table 1 illustrates examples of power consumption according to the present invention.

TABLE 1

Power Down Modes

| | Wireless I/F Unit | Clock Oscillator | Proc. Unit | I/O Unit | Power | Comment |
|---|---|---|---|---|---|---|
| Busy Mode | On | On | On | On | 40 mA | Full operation |
| Power Down Mode 1 | Off | On | On/Clock gated | On | 1 mA | Core leakage + Xtal Osc currents incurred |
| Power Down Mode 2 | Off | Off | On | On | 200 uA | Core leakage current incurred |
| Power Down Mode 3 | Off | Off | Off | On | 50 uA | All memory lost, must do full reboot |

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. An integrated circuit that services communications between a wirelessly enabled host and at least one user input device, the integrated circuit comprising:
   a wireless interface unit that wirelessly interfaces wit the wirelessly enabled host;
   a processing unit operably coupled to the wireless interface unit;
   an input/output unit operably coupled to the wireless interface unit and to the processing unit, wherein the input/output unit also operably couples to the at least one user input device; and
   a power management unit operably coupled to the wireless interface unit, the processing unit, and the input/output unit, wherein the power management unit controls the power consumption of the integrated circuit by:
      assisting the processing unit in entering one of a power down mode and an idle mode, wherein in the idle mode, the wireless interface unit performs first power conserving operations such that the wireless interface unit does not transmit to the wirelessly enabled host, and the wireless interface unit listens to the transmissions of the wirelessly enabled host; and
      receiving notification from the input/output unit that indicates activity by the at least one user input device; and
      causing the processing unit to exit the power down mode or the idle mode in response to the notification.

2. The integrated circuit of claim 1, wherein in the power down mode:
   the processing unit causes the wireless interface unit to be powered down; and
   the power management unit causes the processing unit to be powered down.

3. The integrated circuit of claim 1, wherein in the power down mode the power management unit causes the processing unit and the wireless interface unit to be powered down.

4. The integrated circuit of claim 1, wherein in the power down mode:
   the processing unit causes the wireless interface unit to be powered down; and
   the power management unit causes a processing unit clock to be gated.

5. The integrated circuit of claim 1, wherein in the power down mode:
   the processing unit causes the wireless interface unit to be powered down; and
   the power management unit causes a processing unit clock to be disabled such that it does not oscillate.

6. The integrated circuit of claim 1, wherein the at least one user input device is selected from the group consisting of a cursor control devices and keypads.

7. The integrated circuit of claim 1, further comprising processing unit voltage regulation circuitry that couples the processing unit to a voltage source, wherein the power management unit controls the operation of the processing unit voltage regulation circuitry to controllably power the processing unit.

8. The integrated circuit of claim 1, further comprising wireless interface voltage regulation circuitry that couples the wireless interface unit to a voltage source, wherein the processing unit controls the operation of the wireless interface voltage regulation circuitry to controllably power the wireless interface unit.

9. The integrated circuit of claim 1, further comprising wireless interface voltage regulation circuitry that couples the wireless interface unit to a voltage source, wherein the power management unit controls the operation of the wireless interface voltage regulation circuitry to controllably power the wireless interface unit.

10. The integrated circuit of claim 1, wherein the plurality of power consumption operating states further comprise a suspend mode in which the wireless interface unit periodically second power conserving operations.

11. The integrated circuit of claim 1, wherein in the idle mode the wireless interface unit periodically communicates with the wirelessly enabled host.

12. The integrated circuit of claim 1, wherein first power conserving operations are implemented such that the wireless interface unit periodically communicates with the wirelessly enabled host.

13. The integrated circuit of claim 10, wherein in the suspend mode:
   the wireless interface unit does not transmit to the wirelessly enabled host; and
   the wireless interface unit listens to the transmissions of the wirelessly enabled host.

14. The integrated circuit of claim 13, wherein in the suspend mode the wireless interface unit periodically communicates with the wirelessly enabled host.

15. An integrated circuit that services communications between a wirelessly enabled host and at least one user input device, the integrated circuit comprising:
   a wireless interface unit that wirelessly interfaces with the wirelessly enabled host;
   a processing unit operably coupled to the wireless interface unit;
   an input/output unit operably coupled to the wireless interface unit and to the processing unit, wherein the input/output unit also operably couples to the at least one user input device; and
   a power management unit operably coupled to the wireless interface unit, the processing unit, and the input/output unit, wherein the power management unit operates in cooperation with the processing unit to cause the wireless interface unit and the processing unit to enter one of a plurality of power consumption operating states comprising:
      a busy mode in which all components of the integrated circuit are powered and operational;
      an idle mode in which the wireless interface unit does not transmit to the wirelessly enabled host, and the wireless interface unit listens to the transmissions of the wirelessly enabled host; and
      a power down mode in which the wireless interface unit is powered down and the processing unit enters a power conservation state.

16. The integrated circuit of claim 15, wherein the plurality of power consumption operating states further comprise a suspend mode in which the wireless interface unit performs second power conserving operations.

17. The integrated circuit of claim 15, wherein the power down mode is entered after at least one inactivity period during which the at least one user input device is inactive with respect to the input/output unit.

18. The integrated circuit of claim 15, wherein in the power down mode:
   the processing unit causes the wireless interface unit to be powered down; and
   the power management unit causes the processing unit to be powered down.

19. The integrated circuit of claim 15, wherein in the power down mode
   the power management unit causes the processing unit and the wireless interface unit to be powered down.

20. The integrated circuit of claim 15, wherein in the power down mode:
   the processing unit causes the wireless interface unit to be powered down; and
   the power management unit causes a processing unit clock to be gated.

21. The integrated circuit of claim 15, wherein in the power down mode:
   the processing unit causes the wireless interface unit to be powered down; and
   the power management unit causes a processing unit clock to be disabled so that it does not oscillate.

22. The integrated circuit of claim 15, wherein the at least one user input device is selected from the group consisting of a cursor control devices and keypads.

23. The integrated circuit of claim 15, further comprising processing unit voltage regulation circuitry that couples the processing unit to a voltage source, wherein the power management unit controls the operation of the processing unit voltage regulation circuitry to controllably power the processing unit.

24. The integrated circuit of claim 15, further comprising wireless interface voltage regulation circuitry that couples the wireless interface unit to a voltage source, wherein the processing unit controls the operation of the wireless interface voltage regulation circuitry to controllably power the wireless interface unit.

25. The integrated circuit of claim 15, further comprising wireless interface voltage regulation circuitry that couples the wireless interface unit to a voltage source, wherein the power management unit controls the operation of the wireless interface voltage regulation circuitry to controllably power the wireless interface unit.

26. The integrated circuit of claim 15, wherein in the idle mode the wireless interface unit periodically communicates with the wirelessly enabled host.

27. The integrated circuit of claim 16, wherein in the suspend mode:
   the wireless interface unit does not transmit to the wirelessly enabled host; and
   the wireless interface unit listens to the transmissions of the wirelessly enabled host.

28. The integrated circuit of claim 16, wherein in the suspend mode the wireless interface unit the wireless interface unit periodically communicates with the wirelessly enabled host.

29. An integrated circuit that services communications with a wirelessly enabled host and that services at least one user input device, the integrated circuit comprising:
   a conductive pad ring that couples to an external voltage source;
   a wireless interface unit that wirelessly interfaces with the wirelessly enabled host;
   wireless interface unit voltage regulation circuitry that couples the wireless interface unit to the conductive pad ring, a processing unit operably coupled to the wireless interface unit;

processing unit voltage regulation circuitry that couples the processing unit to the conductive pad ring;

an input/output unit operably coupled to the wireless interface unit and to the processing unit, wherein the input/output unit also operably couples to the at least one user input device; and a power management unit operably coupled to the wireless interface unit, the processing unit and the input/output unit, wherein the power management unit operates in cooperation with the processing unit to cause the wireless interface unit and the processing unit to enter one of a plurality of power consumption operating states comprising:

busy mode in which all components of the integrated circuit are powered and operational:

idle mode in which the wireless interface unit does not transmit to the wirelessly enabled host, and the wireless interface unit listens to the transmissions of the wirelessly enabled host; and power down mode.

30. The integrated circuit of claim 29, wherein in the power down mode:

the processing unit causes the wireless interface unit to be powered down; and the power management unit causes the processing unit to be powered down.

31. The integrated circuit of claim 29, wherein in the power down mode the power management unit causes the processing unit and the wireless interface unit to be powered down.

32. The integrated circuit of claim 29, wherein in the power down mode:

the processing unit causes the wireless interface unit to be powered down; and the power management unit causes a processing unit clock to be gated.

33. The integrated circuit of claim 29, wherein in the power down mode:

the processing unit causes the wireless interface unit to be powered down; and the power management unit causes a processing unit clock to be disabled such that it does not oscillate.

34. The integrated circuit of claim 29, wherein the at least one user input device is selected from the group consisting of a cursor control devices and keypads.

35. The integrated circuit of claim 29, further comprising processing unit voltage regulation circuitry that couples the processing unit to a voltage source, wherein the power management unit controls the operation of the processing unit voltage regulation circuitry to controllably power the processing unit.

36. The integrated circuit of claim 29, further comprising wireless interface voltage regulation circuitry that couples the wireless interface unit to a voltage source, wherein the processing unit controls the operation of the wireless interface voltage regulation circuitry to controllably power the wireless interface unit.

37. The integrated circuit of claim 29, further comprising wireless interface voltage regulation circuitry tat couples the processing unit to a voltage source, wherein the power management unit controls the operation of the processing unit voltage regulation circuitry to controllably power the processing unit.

38. The integrated circuit of claim 29, wherein the plurality of power consumption operating states further comprise a suspend mode in which the wireless interface unit performs second power conserving operations.

39. The integrated circuit of claim 29, wherein in the idle mode the wireless interface unit periodically communicates with the wirelessly enabled host.

40. The integrated circuit of claim 38, wherein in the suspend mode:

the wireless interface unit does not transmit to the wirelessly enabled host; and the wireless interface unit listens to the transmissions of the wirelessly enabled host.

41. The integrated circuit of claim 38, wherein in the suspend mode the wireless interface unit periodically communicates with the wirelessly enabled host.

42. A method for controlling the operation of an integrated circuit that services communications between a wirelessly enabled host and at least one user input device, the integrated circuit including a wireless interface unit, a processing unit, and an input/output unit that couples to the at least one user input device, the method comprising:

when the at least one user input device is active, powering the wireless interface unit, the processing unit, and the input/output unit, and fully enabling operation of the wireless interface unit;

when the at least one user input device has been inactive according to a first inactivity criterion, entering a reduced power mode that includes powering the wireless interface unit, the processing unit, and the input/output unit, and partially disabling operation of the wireless interface unit, wherein the reduced power mode comprises an idle mode in which the wireless interface unit does not transmit to the wirelessly enabled host, and the wireless interface unit listens to the transmissions of the wirelessly enabled host;

when the at least one user input device has been inactive according to a second inactivity criterion, entering a power down mode that includes powering down the wireless interface unit, causing the processing unit to enter a power conservation state, and continuing to power the input/output unit; and when the at least one user input device becomes active from an inactive state, powering the wireless interface unit, the processing unit, and the input/output unit, and filly enabling operation the wireless interface unit.

43. The method of claim 42, wherein the power down mode is entered after at least one inactivity period during which the at least one user input device is inactive with respect to the input/output unit.

44. The method of claim 42, wherein in the power down mode:

the processing unit causes the wireless interface unit to be powered dawn; and the processing unit is powered down.

45. The method of claim 42, wherein in the power down mode:

the power management unit causes the wireless interface unit and the processing unit to be powered down.

46. The method of claim 42, wherein in the power down mode:

the processing unit causes the wireless interface unit to be powered down; and a processing unit clock is gated.

47. The method of claim 42, wherein in the power down mode:

the processing unit causes the wireless interface unit to be powered down; and a processing unit clock is disabled to disable its oscillation.

48. The method of claim 42, wherein the at least one user input device is selected from the group consisting of a cursor control devices and keypads.

49. The method of claim 42, wherein the idle mode further comprises periodic communication between the wireless interface unit and the wirelessly enabled host.

50. The method of claim 42, wherein the reduced power mode further comprises a suspend mode in which the wireless interface unit periodically communicates with the wirelessly enabled host.

51. The method of claim 42, wherein the first reduced power mode includes at least one of:

a first reduced power sub mode that includes powering the wireless interface unit, the processing unit, and the input/output unit, and partially disabling operation of the wireless interface unit to reach a first power consumption level; and a second reduced power sub mode that includes powering the wireless interface unit, the processing unit, and the input/output unit, and partially disabling operation of the wireless interface unit to reach a second power consumption is less than the first power consumption level.

* * * * *

UNITED STATES PATENT AND TRADEMARK OFFICE
CERTIFICATE OF CORRECTION

| | |
|---|---|
| PATENT NO. | : 6,985,755 B2 |
| APPLICATION NO. | : 10/291030 |
| DATED | : January 10, 2006 |
| INVENTOR(S) | : Kevin Cadieux and Robert Hulvey |

It is certified that error appears in the above-identified patent and that said Letters Patent is hereby corrected as shown below:

Column 9, line 64, in Claim 1: replace "wit" with --with--

Column 11, lines 15-16, in Claim 10: replace "periodically" with --performs--

Column 13, line 61, in Claim 37: replace "tat" with --that--

Column 14, line 45, in Claim 42: replace "filly" with --fully--

Column 14, line 53, in Claim 44: replace "dawn;" with --down;--

Signed and Sealed this

Twenty-second Day of July, 2008

JON W. DUDAS
*Director of the United States Patent and Trademark Office*